United States Patent Office 2,833,049
Patented May 6, 1958

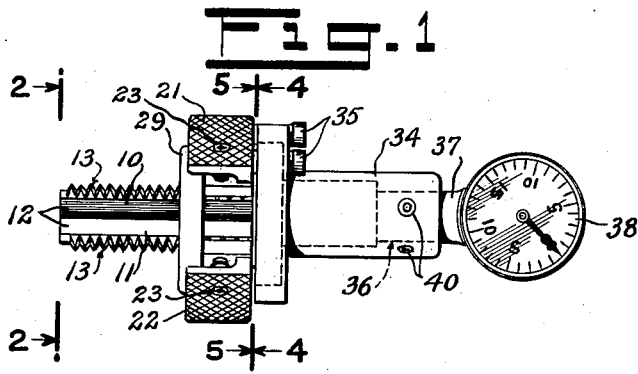

2,833,049

CONTRACTIBLE PLUG GAGE WITH AXIS OF PIVOT WITHIN GAGE SURFACE BOUNDARIES

Stanley G. Johnson, West Hartford, Conn., assignor to The Johnson Gage Development Company, Bloomfield, Conn., a corporation of Connecticut Application July 21, 1955, Serial No. 523,497

13 Claims. (Cl. 33—178)

The invention relates to an internal gage of the contractible and expansible type so that the gage may be axially inserted and removed from a hole to be gaged. The gage preferably is of the comparator type having an indicator for securing a reading as to any variation on the hole from a desired size. The gage is suitable for gaging internal plain surfaces, grooves and internal screw threads, and is portable so that it can be easily carried to a test hole such as may be found in a large casting or part.

The gage includes two members or segments each having a gaging surface. The cross section of each segment is less than a semi-circle although it is desirable to have it as near to a semi-circle as possible yet allowing sufficient contraction for insertion and removal from the hole or internal thread to be gaged. One or both segments are mounted for pivotal movement on a longitudinal axis which lies within the boundaries of the gaging surfaces and adjacent the periphery thereof. Either both gaging means pivot for contraction and expansion or one pivots with respect to the other. The gage in its preferred form is inexpensive to manufacture yet is effective in gaging internal surfaces, holes or internal screw threads.

An object of the invention is to construct a new and novel internal gage which is pivotally contractible and expansible for insertion within a hole to be gaged, is pivotal upon a pivot whose axis is within the boundaries of the gaging surfaces and carries means for limiting the expansion of the gaging members.

Another object is to construct a gage as above in which the expansion limiting means also serves to assure retention of an expansion spring in place.

Another object of the invention is to construct an internal gage of two gaging members one of which pivots with respect to the other or both pivot, the pivot being located interiorly or within boundaries formed by the gaging surfaces or their extension and adjacent to the gaging surface or surfaces with a simple and effective indicating means carried thereby.

A still further object is to construct a gage as above in which adjustment of the indicator is secured in a simple manner for securing a one-to-one ratio for the indicator.

Another object is to construct a contractible gage of the type having a pivot within boundaries formed by the gaging surfaces which can be used as a go or not-go gage.

Other objects of the invention will be more apparent from the following description when taken in connection with the accompanying drawings illustrating a preferred embodiment thereof in which:

Figure 1 is a side elevation of the gage in open position;

Figure 2 is an end view of the gage looking in the direction of 2—2 of Figure 1 with the gage in open position;

Figure 3 is an end view of the gage as in Figure 2 but with the gage in contracted position.

Figure 4 is an end view taken on line 4—4 of Figure 1 showing particularly the means for operating the indicator;

Figure 5 is an enlarged end view of the indicator bracket and the indicator contact element;

Figure 6 is an enlarged end view of the gaging members; and

Figure 7 is a view of the dial indicator with an offset contact element, and

Figure 8 is a longitudinal section through the gage which uses a dial indicator of the axially movable plunger type.

The gage includes a pair of cooperating gaging members 10 and 11, the outer surface of which is arcuate and forms the gaging surface. The gaging surface may conform to a groove to be gaged, may be plain surfaced, either cylindrical or tapered, or may have screw threads 13, either cylindrical as particularly shown or tapered. The center of the arc of each gaging surface 13 is the axis thereof. The gaging members are less than semi-cylindrical or less than a semi-circle in cross section although for more effective gaging, should be of such size as to give a maximum of peripheral gaging surface yet permit sufficient contraction for axial insertion into and removal from a test hole. The gage structure illustrated is like one form shown in applicant's earlier application Ser. No. 309,820, Pat. 2,706,859 all of which forms are applicable herein. Each gage member has a chordal surface 12.

Pivot means pivotally supports or mounts the gaging members, the axis of which means is within the boundaries of the gaging surfaces and preferably the pivot means also is within the boundaries of the gaging surfaces. The pivot means shown in the figures includes a groove 14 extending longitudinally in the chordal surface 12 of at least one gaging member although preferable a groove is provided in each gaging member. The groove particularly illustrated is a V groove although it may be any desirable shape. The grooves are parallel with the axis of the gaging surface. Each groove preferably is as close as possible to the gaging surface and for a screw thread its most desired location is with its edge closely adjacent to the minimum or root circle of the screw thread 13. Each edge 15 of each gaging surface having a screw threaded gaging surface is cut away to the roots of the screw thread in parallel planes for added clearance in removing the gage from a test threaded hole. These edges may serve as gripping or clamping surfaces.

The pivot means for the gaging members includes the grooves 14 forming bearings and a pivot such as a plain pin or rod 19 which may be desirably about 1/10 the diameter of the gage members. The center of the pivot is the axis thereof. The grooves 14 are dimensioned to support the pivot or pin so that the gaging members may pivot thereon. It is clear that there is a considerable range of diameters of pins which may be used for this pivot; however, greater pivoting movement is secured when the pin is small relatively to the diameter of the gage members. The grooves are adjacent to the gaging surface or spaced from the center of the chordal surface of the gaging members. With the grooves in the gaging members the latter provide their own bearing for the pivot pin and the bearing has a length coextensive with the gaging members. Each gaging member supports and gives rigidity to the other.

Each gaging member is secured to a mounting means 21 and 22 in any suitable manner so that the gaging members 10 and 11 project therefrom. The mounting means may be of any suitable shape but an approximate semi-circular shape is convenient. In the construction particularly illustrated the gage member is secured in its respective mounting means by slotting the latter to provide a flexible clamping block 24. A screw 23 forces the clamping block against a side 15 of the gaging member to clamp the latter to the mounting means.

Spring means are provided to press the gaging members onto the pivot and to hold the two mounting means and their gage members in assembled relation and also to expand the gage members. The means particularly illustrated is a coil spring 25, preferably resting in a circular groove 26 extending into the side of each mounting means. One end of the spring is secured to one mounting means such as on the clamp screw 23, passes through the grooves and the other end is secured to the other mounting means such as to the clamping screw 23. The spring circles the mounting means for over 180°. The mounting means 21 and 22 and the spring 25 constitute means for opening and closing the gaging members. Pressing the open ends of the mounting means together against the tension of the spring, contracts the gaging members and the spring resiliently expands the same when the mounting means are released.

The gage is illustrated as a hand or portable gage, that is, it may be moved to the work or may be used by holding it in the hand. The gage is used by pressing the two mounting means or handles together which closes the gaging members with the chordal surfaces in contact or approximate contact whereupon the internal surface, groove or thread to be gaged is slipped over the end of the gaging members or the gage is inserted into the test hole. Upon release of the mounting means, the spring 25 opens or expands the gaging members until they contact the internal surface to be gaged. An indicator to be described thereupon indicates whether or not the internal test surface is within the allowable tolerances and is acceptable. The gage is then closed and removed from the test hole.

It will be observed that it is the spring pressure of the spring 25 which holds the two gaging members 10 and 11 pivotally together on the pivot 19. This pivot is shown as a free pin in that it can slide axially in the grooves 14. The pivot may be two or more balls (not shown). The gaging members have free axial movement with respect to each other, sliding longitudinally on the pivot pin. The gage members, therefore, automatically adjust themselves laterally with respect to a screw thread when this is the type of internal surface which is to be gaged. It is clear that the pivot if desired may be secured to or be a part of one gaging member in which case the bearing or groove 14 carried by the other member constitutes the cooperating pivotal part of the pivot means.

Means are provided to limit the expansion of the gage members. The means particularly shown is a ring 29 which preferably is secured to one of the mounting means such as by a screw 44. The ring has a hole 31 therein which engages the gaging surface or for a screw thread, may engage the outer periphery of the thread. For a go or not-go gage the hole 31 has a diameter allowing the gaging members to expand to a permissible maximum diameter. Upon insertion of the gage within a test hole if the test part or gage is free when turned, the test hole or thread is not too small and if the test part or the gage has excessive shake within the hole, the hole is too large. This test is satisfactory although not as precise as when an indicator is used. The ring 29 has an outer diameter large enough to at least partially cover the groove 26 carrying the spring 25. This ring therefore serves another function in assuring that the spring remains within the groove.

The gage may also be a comparator type of gage indicating the deviation of the test hole from a master or perfect hole or thread. For an indicator gage one of the mounting means such as 21 carries an indicator bracket 34 which is shown secured to the mounting means by means of screws 35. The bracket preferably provides means for adjusting the position of the contact element of an indicator. The means illustrated is a bore 36 through the bracket, the axis of which is approximately in line with the axis of the gage member 10 secured to the mounting means 21. This bore receives the stem 37 of a dial indicator 38. The indicator has a contact point or element 39 which is offset or off center from the axis of the stem 37. The stem is clamped in the bore by suitable means such as screws 40. An indicator with an off-set contact point or element is of the lever type particularly illustrated in Figure 7.

The other mounting means 22 carries cooperating means for engaging the contact point or element 39 of the indicator. The cooperating means 43 is secured to the mounting means such as by a screw 44 and carries a contact surface shown particularly as the surface of a hole 45. The surface of the hole is located so that it engages the contact point of the indicator when the gaging elements are at their gaging position. The hole is positioned so that its axis is approximately in line with the axis of the gaging member 11 which is carried by its mounting means 22. It is the wall of this hole which engages the contact point of the indicator upon contraction and expansion of the gaging members, then the indicator and the cooperating means move relatively with respect to each other.

The indicator with an offset contact point or element and the cooperating means with a hole 45, provides a simple mechanism for adjusting the indicating means so that a one-to-one ratio may be secured in the gaging operation. In other words the indicator contact element 39 should move on the arc of a circle having its center on the axis of the pivot 19 and passing through the axis or center of the gaging members. By loosening the screw 40 and turning the indicator the point 39 is shifted with respect to the wall of the hole 45 so that the contact element or point is nearer or farther from the axis of the pivot pin 19. The hole 45 has a radius approximating the offset of the contact element 39 or 51. This increases or decreases the radius of the arcuate path of movement of the point or increases or decreases the radius of contact with the cooperating surface 45 with respect to the axis of the pivot 19. The adjustment enables the point of contact to be adjusted so that it is on a circle through the axes of the gaging members and when so located, gives a one-to-one gage relationship. The adjustment of the position of the indicator can be tested by noting the reading on the indicator dial for different diameters of master rings or thread rings. In other words if two master rings are known to differ by four thousandths of an inch, the indicator reading should show a difference of four thousandths on the dial for these two master rings. If this reading does not show, then the indicator is turned in the bore 36 until the indicator reading shows a difference of four thousandths of an inch and then it is known that the one-to-one ratio exists.

Figure 8 illustrates the gage using a plunger type of indicator 37', that is, the plunger 50 moves axially to swing the indicator pointer. The end of the plunger 50 has a contact button with an edge 51 extending at a 45° angle. The contacting surface of the cooperating means or particularly the edge of the hole 45 engages the angular edge which moves the plunger axially and indicates the position of the gaging member and hence any difference in diameter of the test part with respect to a master part. The edge is spaced from the axis of the plunger, hence, this indicator also may be adjusted to secure a one-to-one gaging relationship by turning the indicator in the hole 36 which changes the radius of the point of contact between the contact edge 51 and the edge of the hole with respect to the axis of the pivot means 19.

The invention is presented to fill a need for improvements in a contractible plug gage with axis of pivot within the gage surface boundaries. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A pivotally contractible plug gage comprising a pair of mounting means, a gaging member secured to each mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means; and means to indicate the relative position of the gaging members including an indicator bracket secured to one mounting means, means carried by the indicator bracket to support an indicator in axial alignment with the gage members and for adjustment of its position thereon, said indicator having a contact element, and cooperating means carried by the other mounting means and positioned to engage the contact element of an indicator.

2. A pivotally contractible plug gage comprising a pair of mounting means, a pair of gaging members each secured to a mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means; and means to indicate the relative position of the gaging members including an indicator bracket carried by one mounting means, an indicator having a contact element, means carried by the indicator bracket mounting the indicator thereon in alignment with the gaging members and for adjustment of the position of the contact element with respect to the pivot for the gaging members, and cooperating means carried by the other mounting means and engaging the contact element of the indicator.

3. A pivotally contractible plug gage comprising a pair of mounting means, a pair of gaging members each secured to a mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means; and means to indicate the relative position of the gaging members including an indicator bracket secured to one mounting means, the indicator bracket having a circular bore therein at least in approximate alignment with the axis of the gage member secured to that mounting means and adapted to receive the stem of an indicator having a contact element, and cooperating means carried by the other mounting means in a position to engage the contact element of an indicator.

4. A pivotally contractible plug gage as in claim 3 including an indicator having a stem received in the bore of the bracket and a contact element offset from the stem axis.

5. A pivotally contractible plug gage as in claim 4 in which the cooperating means has a hole approximately in alignment with the axis of the gaging means carried by its mounting means and of a radius approximating the offset of the contact element, the contact point of the indicator engaging the wall of the hole as the gaging members expand.

6. A pivotally contractible plug gage comprising a pair of mounting means, a gaging member secured to each mounting means and having an arcuate external gaging surface with the center of the arm forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means, and a ring attached to one mounting means having a hole therethrough engaging the gaging members to limit their expansion.

7. A pivotally contractible plug gage as in claim 6 in which the hole in the ring has a diameter to limit the expansion of the gaging members to the maximum permissible diameter of a test hole.

8. A pivotally contractible plug gage as in claim 6 in which each mounting means has an inwardly extending groove in which the spring means is mounted, and the ring has an outer diameter to at least partially cover the groove in the mounting means.

9. A pivotally contractible plug gage comprising a pair of mounting means having a circular groove extending from one side of each mounting means, a gaging member secured to each mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means including a coil spring having one end attached in the groove of one of the mounting means adjacent to one end thereof and passing around the groove in both mounting means and the other end being attached at the end of the groove in the other member, and a ring attached to one mounting means and adjacent the groove in the latter and having a hole therethrough engaging the gaging members to limit their expansion, the ring having an outer diameter to obstruct at least a portion of the groove.

10. A pivotally contractible plug gage as in claim 9 in which the hole in the ring has a diameter to limit the expansion of the gaging members to the maximum permissible diameter of a test hole.

11. A pivotally contractible plug gage comprising a pair of mounting means having a circular groove extending from one side of each mounting means, a gaging member secured to each mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means within the groove of each mounting means to pivot the mounting means and the gaging members on the pivot means and retain them together, a ring attached to one mounting means having a hole therethrough engaging the gaging members to limit their expansion, and means to indicate the relative position of the gaging members including an indicator carried by one mounting means and having a contact element, and a cooperating means carried by the other mounting means and engaging the contact element as the gaging members expand.

12. A pivotally contractible plug gage comprising a pair of mounting means having a circular groove extending from one side of each mounting means, a gaging member secured to each mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means including a coil spring in the grooves having one end attached to the mounting means adjacent to one end thereof and passing around the grooves in both mounting means and the other end being attached at the end of the groove in the other mounting means, a ring attached to one mounting means adjacent the groove having a hole therethrough engaging the gaging members to limit their expansion, the ring having an outer diameter to obstruct at least a portion of the groove, and means to indicate the relative position of the gaging members including an indicator carried by one mounting means and having a contact element and a cooperating means carried by the other mounting means and engaging the contact element as the gaging members expand.

13. A pivotally contractible plug gage comprising a pair of mounting means, a pair of gaging members each secured to a mounting means and having an arcuate external gaging surface with the center of the arc forming an axis, each gaging member being less than a semi-circle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to pivot the mounting means and the gaging members on the pivot means; and means to indicate the relative position of the gaging members including an indicator bracket secured to one mounting means, the indicator bracket having a circular bore therein at least in approximate alignment with the axis of the gage member secured to that mounting means, an indicator having a contact element with an angular contact edge, cooperating means carried by the other mounting means having a hole approximately in alignment with the axis of the gaging means carried by its mounting means, the angular contact edge of the indicator engaging the edge of the hole as the gaging members expand.

References Cited in the file of this patent

UNITED STATES PATENTS 2,706,859    Johnson _____ Apr. 26, 1955